United States Patent [19]

Kim et al.

[11] 3,857,928

[45] Dec. 31, 1974

[54] PROCESS FOR PRODUCING AMMONIUM METATUNGSTATE FROM AMMONIUM TUNGSTATE BY ION EXCHANGE

[75] Inventors: Tai K. Kim; John M. Laferty; Martin B. Macinnis; James C. Patton; L. Rita Quatrini, all of Towanda, Pa.

[73] Assignee: GTE Sylvania Incorporated, Stamford, Conn.

[22] Filed: Jan. 23, 1974

[21] Appl. No.: 435,976

[52] U.S. Cl............................ 423/593, 75/101 BE
[51] Int. Cl............................................ C01g 41/00
[58] Field of Search................... 423/54, 606, 593; 75/101 BE

[56] References Cited
UNITED STATES PATENTS

| | | | |
|---|---|---|---|
| 2,968,527 | 1/1961 | Baker | 423/54 |
| 3,175,881 | 3/1965 | Chiola et al. | 423/593 |
| 3,231,329 | 1/1966 | Weiss et al. | 423/54 |
| 3,451,764 | 6/1969 | MacWilliams et al. | 435/593 |
| 3,472,613 | 10/1969 | Hay et al. | 423/606 |
| 3,591,331 | 7/1971 | Chiola et al. | 423/606 |

OTHER PUBLICATIONS

Taylor, "Journal of American Chemical Soc.," Vol. 24, 1902, pp. 629–643.

*Primary Examiner*—Herbert T. Carter
*Attorney, Agent, or Firm*—Norman J. O'Malley; John C. Fox; Donald R. Castle

[57] ABSTRACT

A process for producing crystalline ammonium metatungstate (AMT) from ammonium tungstate (AT) solution by introducing AT solution into an ion exchange column containing a weak acid (carboxylic group) cation exchange resin, and collecting the effluent from the column until a pH of about 3.5 is reached. The effluent solution is then digested at about 98°C for about 5 hours, followed by crystallization of AMT by conventional processes, such as, evaporation or spray drying.

8 Claims, No Drawings

3,857,928

PROCESS FOR PRODUCING AMMONIUM METATUNGSTATE FROM AMMONIUM TUNGSTATE BY ION EXCHANGE

BACKGROUND OF THE INVENTION

This invention relates to a process for producing ammonium metatungstate (AMT), and more particularly, relates to producing AMT directly from ammonium tungstate (AT) solution by cation exchange.

At present, both ammonium paratungstate (APT) and AMT are being used as tungsten sources in the catalyst industry. Since APT has a limited solubility in water (about 2–3 percent at room temperature), the user converts APT to a more soluble peroxytungstate form by means of hydrogen peroxide in order to prepare the catalyst. While AMT is highly water soluble, and thus need not be converted, it is in general more expensive than APT, due to the complexity and/or low yields of processes for producing it.

At the present time, crystalline AMT is being produced from APT by a process described in U.S. Pat. No. 3,175,881. Although this process overcomes some of the disadvantages of the prior art, in practice it is somewhat difficult to control for maximum conversion. As a consequence, on crystallization of AMT from solution, the residual APT must be removed in order to produce completely water-soluble AMT products. Another disadvantage of this process is its intermittent batch nature, requiring baking, digesting, filtering and concentrating of solutions before crystallization. On a production scale, such stepwise operations tend to be time consuming and costly.

As an improvement over the above process, a method for producing AMT directly from ammonium tungstate (AT) solution without an appreciable formation of APT is described in U.S. Pat. No. 3,591,331. In this process, AT solution is contacted with a liquid extraction system consisting of Di-2-ethyhexyl phosphoric acid (D-2-EHPA)-tri-n-butyl phosphate (TBP)-kerosene, which extracts ammonium ion and rapidly lowers the pH to the AMT-forming region. The solution is then digested to allow formation of AMT.

While this method substantially avoids the formation of APT and is amenable to continuous processing, it has not found widespread use due to a tendency toward instability of the organic system, and resultant formation of insoluble phospho-tungstates in amounts up to 10 percent or more of the total solid product, depending upon the conditions of formation.

SUMMARY OF THE INVENTION

In accordance with the invention, it has been discovered that contacting an ammonium tungstate (AT) solution having a pH above about 9 with a weak acid cation exchange resin results in lowering of the pH of the solution to the AMT-forming region (pH of at least about 4.5) without appreciable formation of APT, promoting formation of at least some metatungstate ions, and that subsequent digestion at a temperature of at least 98°C for at least 5 hours results in substantially complete conversion of AT solution to AMT solution which when crystallized yields solid AMT.

In accordance with a preferred embodiment the AT solution is continuously passed through a bed of the resin, and the effluent containing some metatungstate ions is collected for subsequent digestion. Thus, the process is amenable to a continuous column operation suitable for production of commercial quantities of AMT.

In accordance with another aspect of the invention, there is provided a stripping process whereby the resin is regenerated for reuse in the exchange process.

DETAILED DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

The weak acid cation exchange resin suitable for use herein may be any conventional weak acid cation exchange resin such as Duolite CC 3 $H^+$ resin, a crosslinked polyacrylic acid containing carboxylic acid groups, having an exchange capacity of 4.2 (all exchange capacities are in milliequivalents per milliliter as $CaCO_3$) (Diamond Shamrock Chemical Company); Amerlite IRC-84 $H^+$ resin, a crosslinked polyacrylic acid containing carboxylic acid groups, having an exchange capacity of 3.5 (Rohm and Haas Company); Amberlite IRC-50 $H^+$ resin, a cross linked polymethacrylic acid containing carboxylic acid groups, having an exchange capacity of 3.5 (Rohm and Haas Company); Bio Rex 70 $Na^+$ resin, a cross-linked polyacrylic acid containing carboxylic acid groups having an exchange capacity of 3.3 (Bio Rad Laboratories), or IWTC-281 $H^+$ resin, a carboxylic type cation exchange resin having an exchange capacity of 4.2 (Illinois Water Treatment Company). However, $H^+$ resins containing carboxylic groups on a polyacrylic lattice, such as Duolite CC3 are in general preferred.

The AT feed solution can be prepared by any of the previously known procedures, including the solvent extraction processing of tungsten values, the dissolution of tungstic acid in ammonium hydroxide, and the like.

While batch processing, i.e., adding the resin batchwise to the AT solution, is of course possible, it is a particular advantage of the invention that the AT solution may be continuously passed through a stationary resin bed or column, and the metatungstate ion-containing effluent continuously collected for subsequent digestion and crystallization. Thus, the description is largely in terms of continous, rather than batch processing.

The concentration of ammonium tungstate in the starting feed solution can vary from less than one gram per liter to about 250 grams per liter, $WO_3$ basis. A feed solution of from about 180 grams per liter to about 190 grams per liter $WO_3$ basis, is preferred from a capacity and equipment investment viewpoint on the basis of cost per unit of tungsten processed. Such tungsten solutions will generally have a pH ranging from about 9 to 11.

For solution concentrations between about 250 and about 140 grams per liter, the AT solution should be passed through the resin bed or column at the rate of from about 10 ml/min to about 65 ml/min, in order to achieve a pH within the AMT-forming range. For concentrations between about 180 and about 190 grams per liter, flow rate should be held between about 20 ml/min and about 30 ml/min, based upon these considerations.

Depending upon resin capacity (grams of product per grams of resin) the amount of AT solution which may be processed before resin regeneration is required will vary. A convenient method of determining this is by periodically or continuously measuring the pH of the effluent. When the pH increases above about 4.5, or preferably 3.5, addition of AT solution and collection of effluent should cease, above which insoluble APT might form, contaminating both the resin bed and the effluent.

The collected effluent containing some metatungstate species must be digested at a temperature of at least about 98°C for at least about 5 hours, to obtain substantially complete conversion from AT to AMT solution.

Crystallization of AMT from solution may be carried out in the conventional manner, such as by evaporation or spray drying.

Regeneration of the resin may be carried out using a mineral acid, such as hydrochloric or sulfuric acid. A solution of $H_2SO_4$ having a concentration from about 0.7 to 3.6 normal is preferred for best efficiency and economy.

To illustrate the invention in further detail, an example is presented.

EXAMPLE

A two inch resin column is prepared using 539 grams of Duolite CC3 $H^+$ resin. Add 1.5 liters of ammonium tungstate (185 grams $WO_3$ per liter) solution at a rate of 25 milliliters per minute to the top of the resin column. Collect the effluent in a vessel with agitation and monitor the pH of the effluent with a pH meter. When the pH of the effluent reaches 3.5, stop the collection of the effluent. The volume of the effluent solution containing ammonium metatungstate ion is 1.4 liters. Digest this solution at 98°C for 5 hours and evaporate to dryness to isolate the crystalline ammonium metatungstate product. Wash the column with water and collect this wash solution (about 200 milliliters) which contains small amounts of tungsten. Use this wash solution for diluting the initial ammonium tungstate solution. Continue washing the column until the washing solution becomes almost neutral in pH. At this time, check the wash solution with Nessler's reagent. If it gives a negative test for ammonium ion, the column is ready for regeneration. In order to regenerate the column to the hydrogen form, add sulfuric acid having a concentration of 0.86 normal at a rate of 25 milliliters per minute to the column until the pH becomes strongly acidic.

While there has been shown and described what are at present considered the preferred embodiment of the invention, it will be obvious to those skilled in the art that various changes and modifications may be made therein without departing from the scope of the invention as defined by the appended claims.

What is claimed is:

1. A process for producing crystalline ammonium metatungstate comprising:
    1. contacting an aqueous ammonium tungstate solution having a pH of at least 9 with a carboxylic acid cation exchange resin in an amount sufficient to extract ammonium ions from the aqueous solution and to lower the pH thereof to below at least about 4.5 to form at least some metatungstate ions;
    2. separating the aqueous solution containing the metatungstate ions from the resin;
    3. heating the aqeuous solution containing metatungstate ions at a temperature of at least about 98°C for at least about 5 hours; and
    4. crystallizing ammonium metatungstate from the aqueous solution.

2. The process of claim 1 wherein sufficient resin is added to the aqueous solution containing metatungstate ions to lower the pH thereof to below about 3.5.

3. The process of claim 1 wherein the concentration of the aqueous ammonium tungstate solution is about 140 $gWO_3/l$ to 250$gWO_3/l$ and the solution is contacted with the resin by continuously passing the solution through a bed of the resin at a flow rate of from about 10 ml/min to about 65 ml/min.

4. The process of claim 3 wherein the concentration of the aqueous ammonium tungstate solution is from about 180$gWO_3/l$ to about 190$gWO_3/l$ and the flow rate of the solution through the column is from about 20 ml/min to about 30 ml/min.

5. The process of claim 3 wherein the carboxylic acid cation exchange resin is a crosslinked polyacrylic acid containing carboxylic acid groups.

6. The process of claim 1 wherein the resin is regenerated for reuse by removing the ammonium ions therefrom.

7. The process of claim 6 wherein a mineral acid strip solution is used to remove the ammonium ions.

8. The process of claim 7 wherein the mineral acid is sulfuric acid having a concentration of from about 0.7 normal to 3.6 normal.

* * * * *